United States Patent [19]

Nattel

[11] Patent Number: 4,842,156
[45] Date of Patent: Jun. 27, 1989

[54] ELECTRICAL OUTLET BOX WITH LOCATING FINGERS

[75] Inventor: William Nattel, Montreal, Canada

[73] Assignee: Commander Electrical Materials, Inc., Saint-Jean-sur-Richelieu, Canada

[21] Appl. No.: 170,263

[22] Filed: Mar. 18, 1988

[51] Int. Cl.[4] .............................................. H02G 3/08
[52] U.S. Cl. ..................................... 220/3.9; 220/3.92
[58] Field of Search .................. 220/3.2, 3.5, 3.6, 3.7, 220/3.9, 3.92, 3.94

[56] References Cited

U.S. PATENT DOCUMENTS

| | | | |
|---|---|---|---|
| D. 52,805 | 12/1918 | Nickerson | 220/3.9 X |
| 948,438 | 2/1910 | Ziegler et al. | 220/3.92 |
| 1,534,723 | 4/1925 | Lewis | 220/3.94 |
| 2,214,968 | 9/1940 | MacMillen | 220/3.9 |
| 2,556,061 | 6/1951 | Buckels | 220/3.92 |

Primary Examiner—Steven M. Pollard
Attorney, Agent, or Firm—Larson & Taylor

[57] ABSTRACT

An improved side plate for use in electrical boxes having locating fingers formed thereon at its ends outside its main body. The locating fingers are bent transversely from the plate about bend lines extending parallel to the front side of the plate.

The invention is also directed toward an electrical box incorporating the side plates and a method of making the side plates.

3 Claims, 4 Drawing Sheets

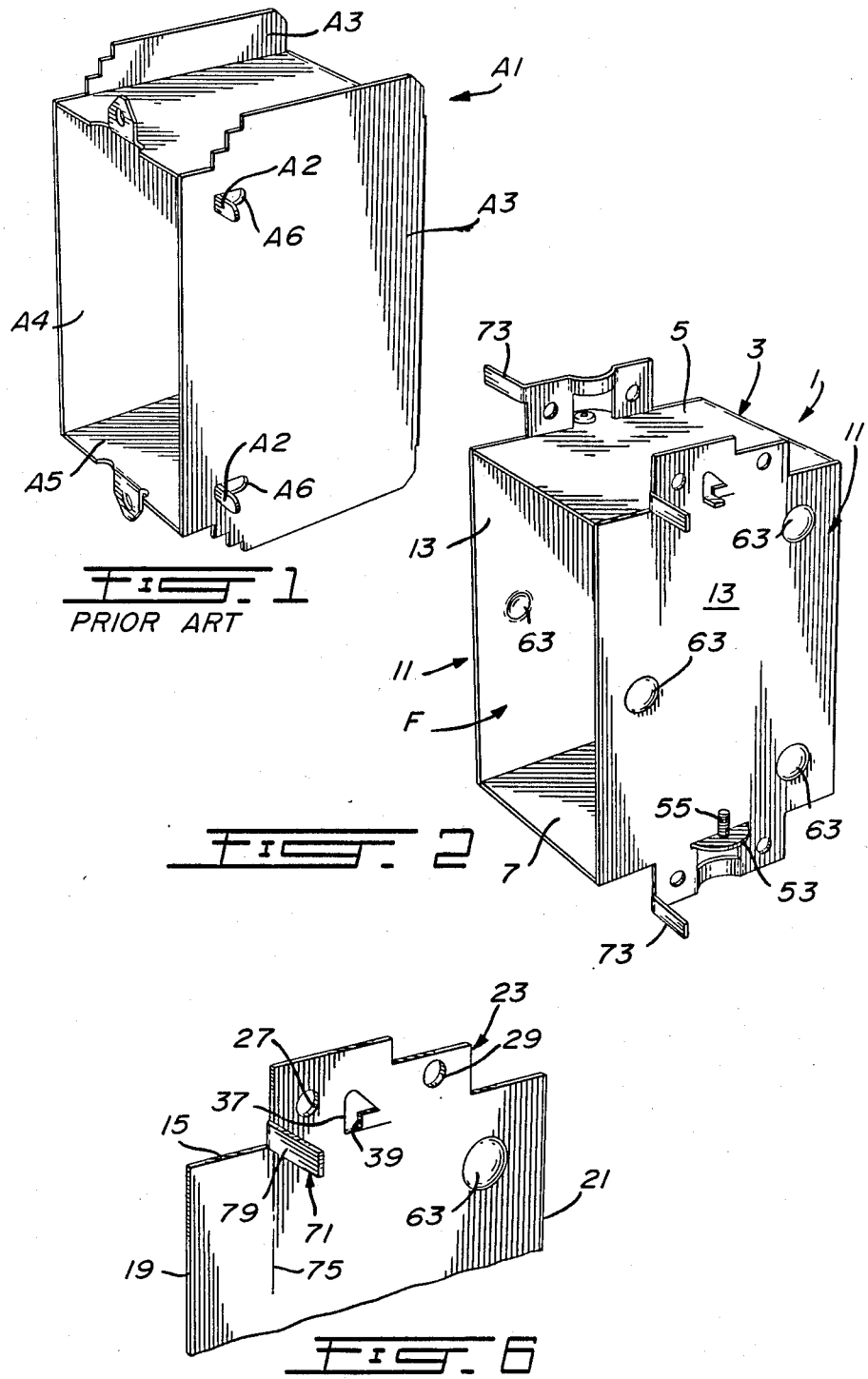

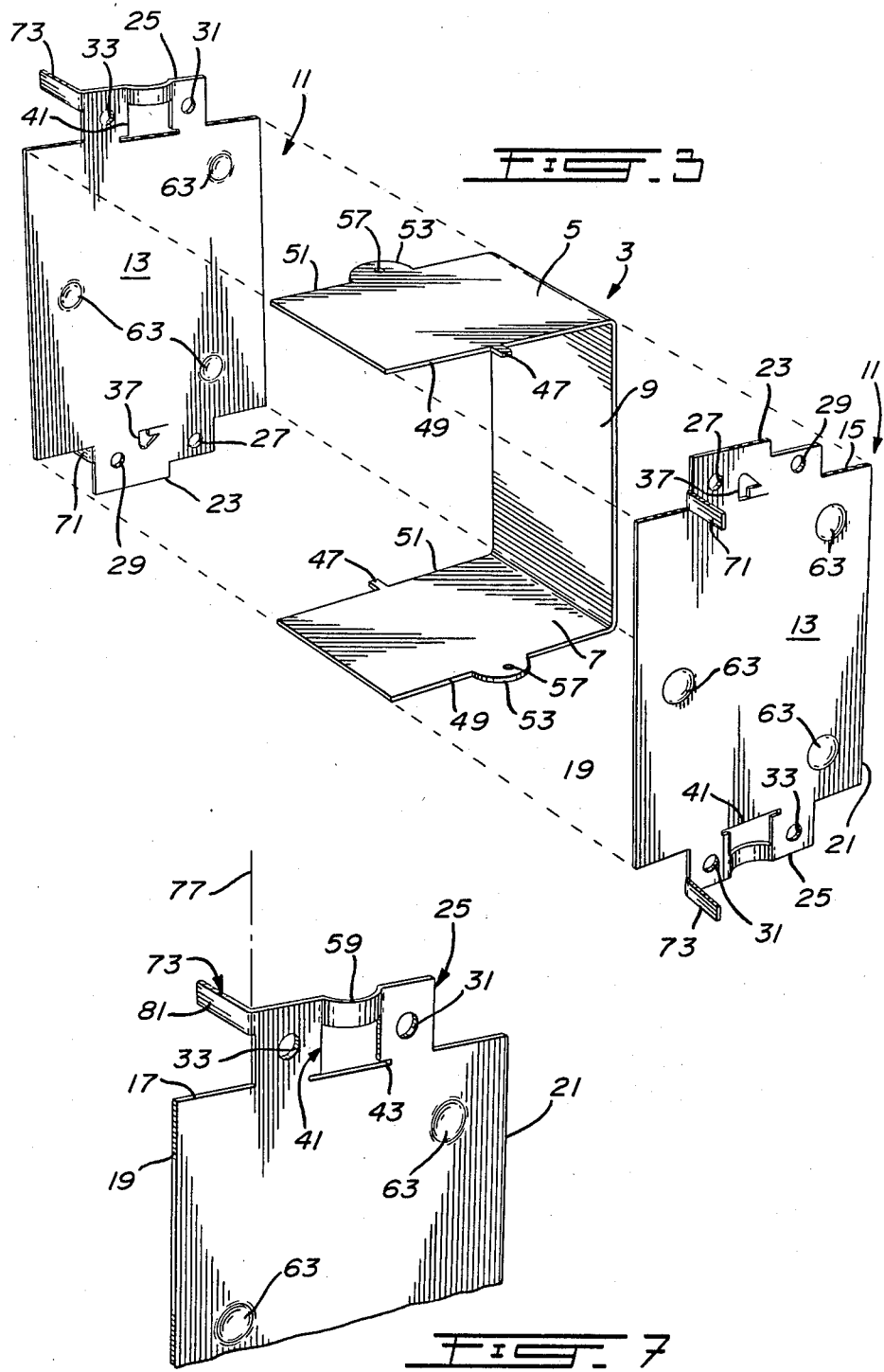

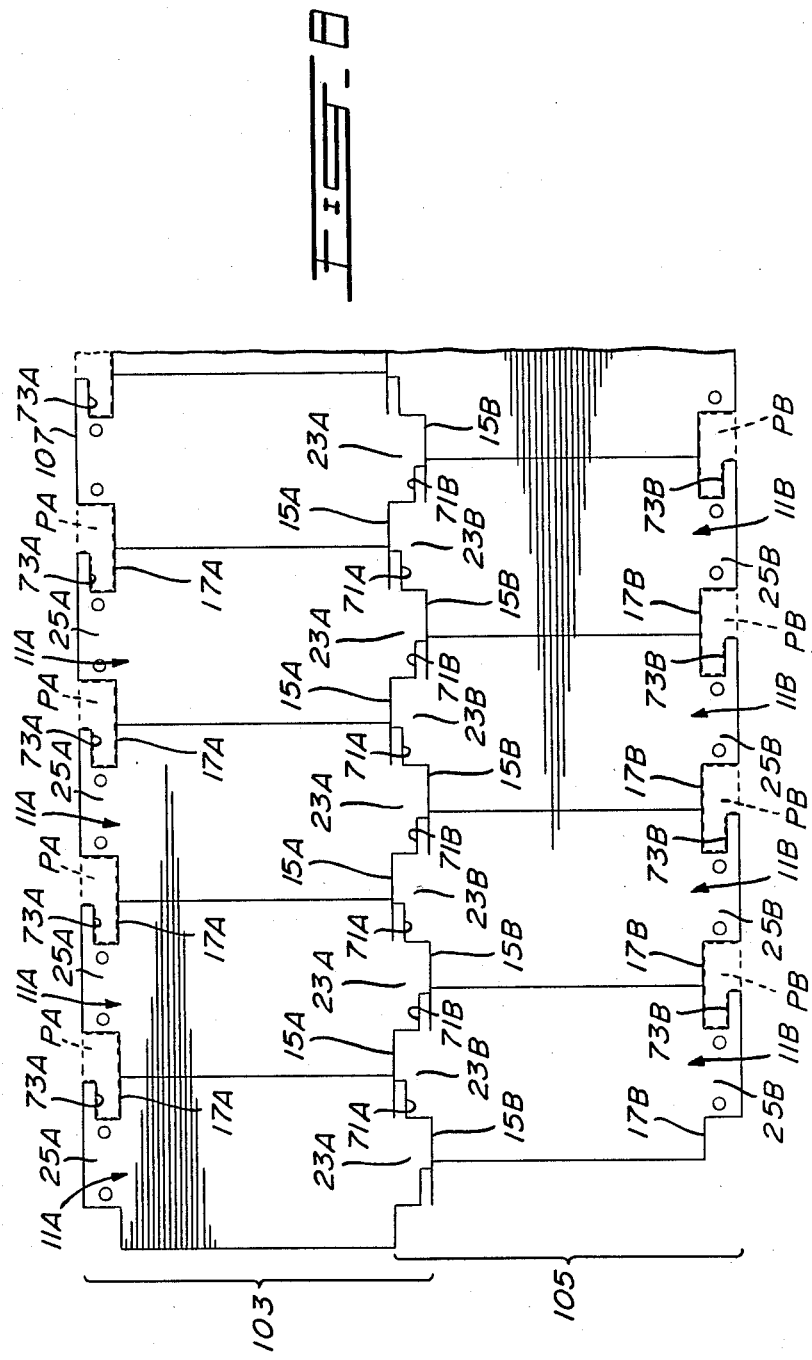

ELECTRICAL OUTLET BOX WITH LOCATING FINGERS

This invention is directed toward an improved side plate for use in electrical outlet boxes. The invention is also directed toward an improved electrical outlet box incorporating the improved side plate. The invention is more particularly directed toward an improved, metallic, sectional or gangable type of electrical outlet box incorporating the improved side plate.

The invention is also directed toward a method of making the side plates.

Electrical outlet boxes of the metallic, knockdown type are well known. They usually comprise a U-shaped metal plate forming the top, bottom and back walls of the box and two, flat metal side plates closing the open sides of the U-shaped plate and forming the side walls of the box. The side plates are each detachably connected to the U-shaped plate. Usually an interconnecting lug and slot arrangement connects one end of the side plate to one of the top or bottom walls of the U-shaped plate, and a tab on the other of the top or bottom walls passes through a slot on the other end of the side plate. A screw is threaded through the tab to bear against the outside of the side plate to hold it securely against the side edge of the U-shaped plate.

The single tab used in connecting each side plate to the U-shaped plate projects some distance past the side plates, and normally prevents the box from being mounted flush and level against a stud during installation. It is known to form mounting projections in at least one, and preferably both, side plates to allow the box, having projecting tabs, to be mounted level against a stud. The mounting projections, at least three in number, are generally conically shaped and spaced apart on the side plate. They project approximately as far from the outer surface of the side plate as does the tab when the side plate is connected to the U-shaped plate, and thus the outer ends of the projections lie in a plane that is parallel to the side plate. The projections abut against the stud during installation of the box, allowing the box to be mounted level relative to the stud. A box, as described above, is shown in U.S. Pat. No. 2,639,054.

It is known to provide non gangable or sectional electrical boxes, without mounting projections, with locating fingers on the side plates formed in an area that does not create an opening in the box. The locating fingers are formed to extend transversely from the top and bottom ends of the side plate and thus are outside of the interior box area closed by the side plate. The fingers are bent along bend lines extending parallel to the top and bottom ends of the side plate to extend transversely to the side plate so as to be in a position to properly locate the box. An example of such a box is shown in U.S. Pat. No. 2,738,894.

Forming the locating fingers in the manner and location shown in U.S. Pat. No. 2,738,894 presents some problems however. The locating fingers present a narrow edge rather than a wide side to the overlying drywall. The narrow edge cuts into the drywall damaging and/or weakening it. Also, the position of the locating finger results in a large amount of waste material when stamping out the side plates with the fingers. Further, the position of the locating fingers prevent close stacking of the boxes. The fingers on one box interfere with the sides of an adjacent box to prevent the box sides from abutting. Thus more packing space is required for these boxes than for boxes that can be stacked with their sides abutting.

It is the purpose of the present invention to provide an improved side plate for use in electrical outlet boxes, and also to provide an improved electrical outlet box incorporating the improved side plate, which minimizes, or eliminates the problems associated with using locating fingers on the plates and the boxes. The improved side plate, and electrical outlet box is particularly suited for use with mounting projections in the side plate.

It is more particularly the purpose of the present invention to provide an improved side plate for use in electrical outlet boxes which side plate has the locating fingers outside the area of the side plate which closes the electrical box, while at the same time minimizing the waste material in forming the fingers. It is another purpose of the present invention to form the locating fingers in a manner which prevents damage to a covering drywall. It is a further purpose to have the locating fingers in a position permitting closer stacking of electrical boxes incorporating the fingers.

In accordance with the present invention, at least one, and preferably both side plates of an electrical box are provided with a short extension at each end of the main body of the plate. The extensions extend longitudinally past the ends of the main body of the side plate and are generlaly centrally located. A locating finger initially extends from each extension, toward the front side of the main body plate and is parallel to the ends of the main body. Each finger is bent to extend transversely outwardly of the main body of the plate about a bend line that extends parallel to the front side of the main body of the plate. The wide sides of the two fingers are in the same plane.

This construction positions the locating fingers outside of the area of the side plate closing the box, and also outside of the ends of the main body of the side plate. Thus boxes formed using these side plates have no large openings in the side plates that open into the box. In addition, with the fingers located outside the main body of the side plates, the boxes can be easily stacked with their sides close together. Further, having the fingers initially formed to extend parallel to the ends of the main body of the side plate reduces the amount of material required to produce the plates even if the fingers are made longer than normal due to the use of mounting projections in the side plates. The initial positioning of the fingers, parallel to the ends of the main body of the plate, results in the wide sides of the fingers facing the studs and the overlaid drywall after the fingers have been bent, and the boxes have been installed. The wide sides of the fingers do not cut into the drywall, as would the narrow edges of the fingers.

The invention is particularly directed toward a side plate for forming the side of a metallic, knockdown, electrical outlet box. The side plate has a generally rectangular main body with first and second ends and front and back sides. A first extension extends longitudinally from the main body at its first end and a second extension extends longitudinally from the main body at its second end. A locating finger initially projects from each extension toward the front side of the the main body, generally parallel to the ends of the main body.

The invention is also particularly directed toward a metallic, knockdown, electrical outlet box having: a U-shaped plate forming top, bottom and back walls of the box; and two generally rectangular side plates having first and second ends and front and back sides, th side plates forming side walls of the box. Means detachably connect each side plate to the U-shaped plate to close an open side of the U-shaped plate. At least one side plate has a first extension extending longitudinally from the first end of the side plate and a second extension extending longitudinally from the second end of the side plate. A locating finger initially projects from each extension toward the front side of the plate, generally parallel to the ends of the plate. Each finger is bent along a bend line extending parallel to the front side of the plate, to extend outwardly, transverse from the plate.

The invention will now be described in detail having reference to the accompanying drawings in which:

FIG. 1 is a perspective view of an electrical box known in the prior art;

FIG. 2 is a perspective view of the improved electrical outlet box;

FIG. 3 is an exploded perspective view of the improved electrical outlet box;

FIG. 6 is a detail perspective view of the first end of the side plate;

FIG. 7 is a detail perspective view of the second end of the side plate; and

FIG. 8 is a layout showing how the side plates are stamped out of a strip of material.

Figure 4:
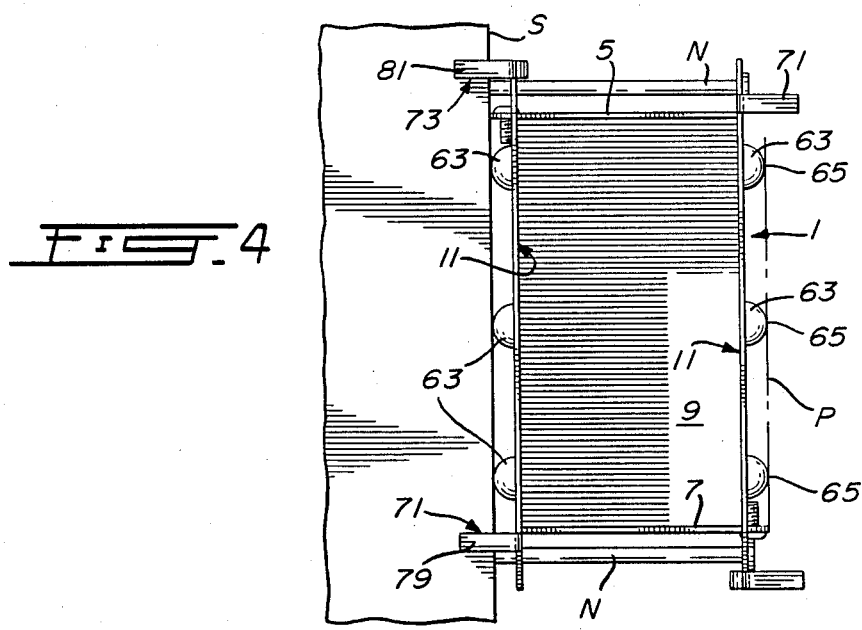
FIG. 4 is a front view of the outlet box mounted on a stud.

FIG. 1 illustrates an electrical box A1 known in the prior art with locating fingers A2 extending laterally from the sides of the box to locate the open front of the box a predetermined distance in front of the stud it is to be mounted on. This distance is usually equal to the thickness of the drywall to be mounted on the studs. The fingers A2 are located at the top and bottom of the box and extend laterally from one or both sides of the box. The box is positioned alongside the stud with the fingers A2 resting against the front of the stud. In this position, the open front A4 of the box is located the proper distance in front of the stud and the box is then permanently mounted on the stud.

The locating fingers A2 are usually each formed by stamping a finger shaped in the side plate A3 and bending this stamped-out finger shape outwardly from the side plate to form a locating finger A2. The finger shapes are usually stamped out in the central area of the side plate within the space bounded by the U-shaped plate A5, when the side plate is mounted on the U-shaped plate. The opening A6 left in the side plate, when the stamped finger shape is bent to form a finger, is normally within the maximum size of opening permitted in the walls of the box by the Electrical Code.

When the locating fingers are employed with the boxes having mounting projections, the fingers must be made longer in order to reach the stud to properly locate the box. The mounting projections space the side wall of the box away from the stud necessitating the longer fingers. However, in making longer fingers, larger openings A6, left from forming the fingers, are present in the side plate A3. These openings often are larger than the maximum opening size permitted by the Electrical Code. Thus in boxes employing projections, the locating fingers normally cannot be formed in the side plates in areas that open into the box.

The metallic, knockdown electrical box 1 of the present invention, as shown in FIGS. 2 and 3, has a U-shaped plate 3 forming the top wall 5, the bottom wall 7 and the back wall 9 of the box. Two generally rectangular side plates 11 close the open sides of the main plate 3 forming the side walls 13 of the box. Each side plate 11 is detachably connected to a side of the U-shaped plate 3 with connecting means to be described.

Each side plate 11 has a rectangular main body 13 with first and second ends 15, 17 and front and back sides 19, 21. A first, short extension 23 extends past the first end 15 of the main body 13 and a second, short extension 25 extends past the second end 17 of the main body.

Figure 5:
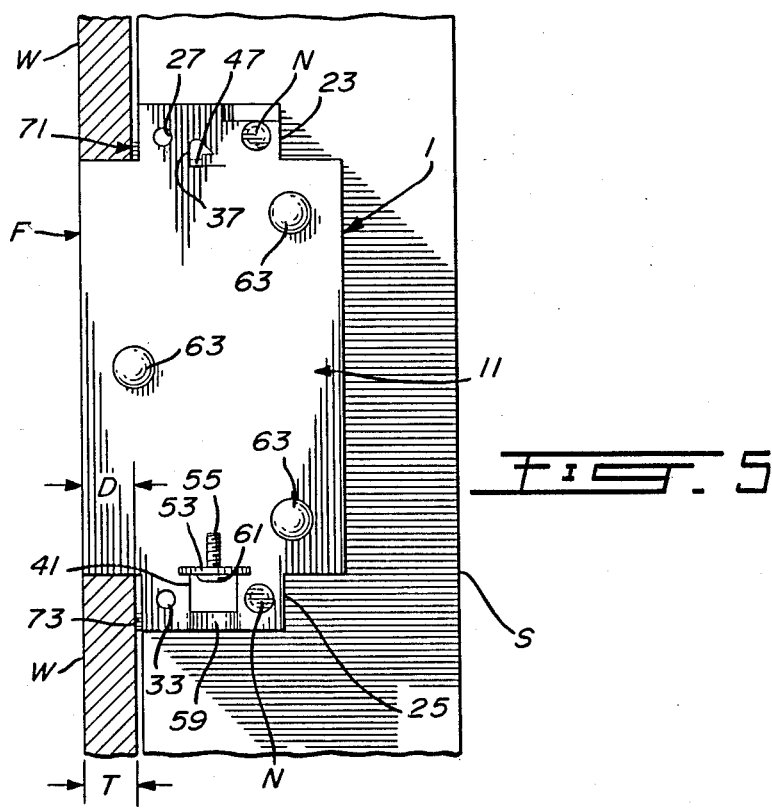
FIG. 5 is a side view of the outlet box mounted on a stud.

The first and second extensions 23, 25 are narrower than the width of the main body 13 of the plate and are generally centrally located between the sides 19, 21 of the main body 13. Pairs of holes 27, 29 and 31, 33 are provided in the corners of the extensions 23, 25 respectively. Nails "N" can be passed through the holes 27 or 29 and 31 or 33 in both side plates 11 and driven into a stud "S", as shown in FIGS. 4 and 5 to attach the box 1 to the side of the stud as is well known.

The connecting means connecting each side plate 11 to the main plate 3 includes a triangular shaped opening 37 in the first extension 23 on each side plate 11 between the holes 27, 29 as is shown in FIG. 3. A locking tab 39 projects into the opening 37. Each side plate 11 also has a T-shaped opening 41 in the second extension 25 with the cross-bar 43 of the T-shaped opening 41 generally aligned with the end 17 of the plate. The connecting means further includes a lug 47 projecting from each side edge 49, 51 of the U-shaped plate 3 and a tab 53 projecting from each side edge 49, 51. Preferably, there is a lug 47 and a tab 53 on the side edges 49, 51 respectively of the U-shaped plate 3 in the top wall 5 and a lug 47 and a tab 53 on the side edges 51, 49 respectively of the U-shaped plate 3 in the bottom wall 7.

A first side plate 11 is mounted on one side of the U-shaped plate 3 with its opening 37 on top, and a second side plate 11 is mounted on the other side of the U-shaped plate 3 with its opening 37 on the bottom.

The lugs 47 on the U-shaped plate 3 fit in the openings 37 in the side plates 11 and are held therein by the locking tabs 39. The tabs 53 slide through the cross-bar 43 of the T-shaped openings 41 on the side plates 11. A screw 55 is threaded through a threaded hole 57 in each tab 53 to bear against the outside of the side plate 11 and hold it locked to the main plate 3. The central portion of the extension 17 is bent inwardly as shown at 59 to provide clearance for the head 61 of the screw 55.

At least one, and preferably both, side plates 11 have at least three mounting projections 63 formed in the main body 13 and projecting outwardly therefrom. The projections 63 are spaced from each other and preferably form the corners of a triangle. The outer ends 65 of the projections extend at least as far outwardly of the outer surface of the side plate as does the tab 53 past the side plate 11. The outer ends 65 of the projections 63 lie in a plane "P" as shown in FIG. 4 that is parallel to the side plate 11 and allow the box 1 to be mounted level against a stud "S" notwithstanding the tab 53 projecting past the side plate 11.

In accordance with the present invention, at least one and preferably both, side plates 11 are provided with flat locating fingers 71, 73. Locating finger 71, as shown in FIG. 6 is connected to the first extension 23 adjacent to the first end 15 of the main body 13 and locating finger 73, as shown in FIG. 7, is connected to the second extension 25 adjacent to the second end 17 of the main body 13. Locating finger 71 initially extends toward the open front "F" of the box and is generally parallel to the first end 15 of the main body 13 of plate 11. Locating finger 73 also initially extends toward the open front "F" of the box and is generally parallel to the second end 17 of the main body 13. Preferably locating finger 73 is spaced longitudinally from the second end 17 of the main body 13. Both fingers 71, 73 are bent from their initial position to extend transversely outwardly from side plate 11. The fingers 71, 73 are bent along lines 75, 77 respectively which bend lines extend parallel to the sides 19, 21 of the main body 13 of plate 11. The wide sides 79, 81 of the bent, flat fingers 71, 73 are vertical to bear, on one side, against a stud "S", and on the other side, against installed wallboard "W".

The fingers 71, 73, in their bent position, are spaced a distance "D" from the front "F" of the box 1 a distance generally equal to the thickness "T" of the wallboard "W" to be employed as illustrated in FIG. 5. The fingers 71, 73 are made long enough to reach the stud "S" on which the box is to be mounted even though the box is spaced away from the stud by the mounting projections 63. Since the fingers 71, 73 are attached to the extensions 23, 25, they are located outside of the portion of the side plates 11 closing the box 1 and thus there are no openings into the box through the side plates 11 caused by forming the fingers. The location of the fingers 71, 73 on the extensions 23, 25 particularly with finger 73 longitudinally spaced from end 17, also permits the boxes to be stacked with their side plates adjacent to each other.

The side plates 11 are formed by stamping them out of a thin, narrow plate 101 of suitable metal material as shown in FIG. 8. A first row 103 of plates 11A, arranged side-by-side, is stamped out of plate 101, as is a second row 105 of plates 11B, parallel to the first row 103. The plates 11A in the first row 103 are arranged with their first extension 23A on the inside, adjacent the row 105 of plates 11B, and the plates 11B in row 105 are also arranged with their extensions 23B on the inside, adjacent the row 103 of plates 11A. The plates 11A in the first row 103 are offset laterally with respect to the plates 11B in the second row 105 a distance generally equal to half the width of a plate. This arrangement permits the extension 23A on all but the first of the plates 11A in row 103 to be located between two adjacent extensions 23B on adjacent plates 11B in row 105. Thus the width of plate 101, between its sides 107, 109 need only be equal to two lengths of the main body 13 of side plate 11 plus the lengths of two extensions 25 and one extension 23.

The locating fingers 73A, 73B, formed to extend laterally from second extensions 25A, 25B respectively, are formed within the width of strip 101 in a scrap piece "PA" or "PB" of material punched out between adjacent extensions 25A on the plates 11A in row 103 and between adjacent extensions 25B on the plates 11B in row 105. Thus no extra material is required in forming locating fingers 73A, 73B. Preferably, the fingers 73A, 73B are formed adjacent the sides 107, 109 of the strip 101, spacing them from the second ends 17A, 17B of the side plates.

The locating fingers 71A, 71B are formed to extend laterally from the adjacent first extensions 23A, 23B of plates 11A, 11B in rows 103, 105. Locating finger 71A extends from extension 23A in one direction and fits in a cut-out portion of extension 23B. Locating finger 71B extends from extension 23B in the opposite direction and fits in a cut-out portion of extension 23A. The locating fingers 71A, 71B are formed, in effect, from extensions 23B, 23A respectively and are adjacent the first ends 15A, 15B of the plates.

Preferred embodiment of the invention are illustrated by way of examples. It is to be expressly understood, however, that the description and drawings are only for the purpose of illustration and as an aid to understanding and not intended as a definition of the limits of the invention.

I claim:

1. A metallic knockdown, electrical outlet box having:

a U-shaped plate forming top, bottom and back walls of the box;

two side plates, the side plates forming side walls of the box;

means detachably connecting each side plate to the U-shaped plate to close an open side of the U-shaped plate;

each side plate having a rectangular main body with first and second ends and front and back sides;

at least one of the plates having a first extension extending longitudinally from the main body at its first end, and a second extension extending longitudinally from the main body at its second end such that the first extension and the second extension extend beyond the top and bottom walls of the box;

a locating finger initially projecting from each extension toward the front side of the main body, generally parallel to the ends of the main body, each finger being bent along a bend line extending parallel to the front side of the main body to extend outwardly, transversely from the main body and said locating finger on said second extension being spaced outwardly of said second end of said side plate main body.

2. An electrical outlet box as claimed in claim 1 wherein the bend lines are located a distance from the front side of the main body of the plate generally equal to the thickness of drywall to be mounted on a wall to cover the outlet box in which the side plate is used.

3. An electrical outlet box as claimed in claim 1 wherein at least the one plate has mounting projections formed in the main body to extend outwardly transversely from the main body, the projections spaced apart on the main body, the locating fingers being longer than the projections.

* * * * *